(12) United States Patent
Iki

(10) Patent No.: US 10,025,167 B2
(45) Date of Patent: Jul. 17, 2018

(54) PROJECTION-TYPE DISPLAY DEVICE

(71) Applicant: SEIKO EPSON CORPORATION, Tokyo (JP)

(72) Inventor: Takunori Iki, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/613,559

(22) Filed: Jun. 5, 2017

(65) Prior Publication Data

US 2018/0004072 A1    Jan. 4, 2018

(30) Foreign Application Priority Data

Jun. 29, 2016   (JP) .................................. 2016-128516

(51) Int. Cl.
*G03B 21/00* (2006.01)
*H04N 9/31* (2006.01)
*G03B 33/12* (2006.01)

(52) U.S. Cl.
CPC .......... *G03B 21/008* (2013.01); *G03B 33/12* (2013.01); *H04N 9/315* (2013.01); *H04N 9/3194* (2013.01)

(58) Field of Classification Search
CPC .... G03B 21/008; G03B 21/147; G03B 21/14; H04N 9/3194; H04N 9/3111; H04N 9/3114

USPC .......................................................... 348/771
See application file for complete search history.

(56) References Cited

U.S. PATENT DOCUMENTS 5,914,783 A * 6/1999 Barrus ..................... G01S 3/784
                                                            345/157

FOREIGN PATENT DOCUMENTS

| JP | 2004-252118 A | 9/2004 |
| JP | 2013-192189 A | 9/2013 |
| JP | 2015-220661 A | 12/2015 |

\* cited by examiner

*Primary Examiner* — Ryan Howard
(74) *Attorney, Agent, or Firm* — Oliff PLC (57) ABSTRACT

A projection-type display device includes a light source unit, an electro-optical device that modulates light emitted from the light source unit, and a projection optical system that projects the light modulated by the electro-optical device. In the electro-optical device, when a mirror that modulates light assumes an ON posture, the light from the light source unit is reflected in an ON direction toward the projection optical system and, when the mirror assumes an OFF posture, the light from the light source unit is reflected in an OFF direction different from the ON direction. An image capture element that receives incident light that has entered the projection-type display device from the outside via the projection optical system is provided in a direction in which the incident light is reflected by the mirror that assumes the OFF posture.

6 Claims, 6 Drawing Sheets

PROJECTION-TYPE DISPLAY DEVICE

BACKGROUND

1. Technical Field

The present invention relates to a projection-type display device that projects light from a light source unit while modulating the light by mirrors.

2. Related Art

In projection-type display devices, light emitted from a light source unit is modulated by an electro-optical device and then the modulated light is projected in an enlarged manner by a projection optical system. In those projection-type display devices, a technology for capturing a projected image is proposed. For example, there is proposed a structure in which a projection image is captured by a camera and feedback is given to the projection image based on the image capture result (see JP-A-2013-192189 and JP-A-2015-220661). Further, there is proposed a structure in which an optical path separating element is provided between the electro-optical device and the projection optical system and light that has entered the projection-type display device from the outside via the projection optical system is guided to an image capture element via the optical path separating element (see JP-A-2004-252118).

In the structure in which a camera is added to the projection-type display device as in the structure described in JP-A-2013-192189 and JP-A-2015-220661, however, an error may occur between an image projection position and an image capture position of the camera and it is therefore difficult to accurately perform correction of the projection position or the like. When the optical path separating element is added between the electro-optical device and the projection optical system as in the structure described in JP-A-2004-252118, a problem may arise in that the light intensity of one of the projection light and the image capture light increases while the light intensity of the other decreases.

SUMMARY

An advantage of some aspects of the invention is that a projection-type display device capable of reducing the occurrence of an error between a projection position and an image capture position and eliminating the need to add an optical path separating element for capture of an image is provided.

A projection-type display device according to a first aspect of the invention includes a light source unit, an electro-optical device that modulates light emitted from the light source unit, and a projection optical system that projects the light modulated by the electro-optical device. The electro-optical device includes a mirror that modulates light, and a drive element that causes the mirror to switch between an ON posture in which the mirror reflects the light from the light source unit in an ON direction toward the projection optical system and an OFF posture in which the mirror reflects the light from the light source unit in an OFF direction different from the ON direction. An image capture element that receives incident light that has entered the projection-type display device from an outside via the projection optical system is provided in a direction in which the incident light is reflected by the mirror that assumes a posture different from the ON posture and a posture perpendicular to the ON direction.

In the first aspect of the invention, when the light is radiated from the light source unit onto the mirror that modulates light and when the mirror assumes the ON posture, the light from the light source unit is reflected in the ON direction toward the projection optical system. When the mirror assumes the OFF posture, the light from the light source unit is reflected in the OFF direction different from the ON direction toward the projection optical system. Thus, by controlling the posture of each of the plurality of mirrors, the light from the light source unit can be modulated and an image can be projected from the projection optical system. The image capture element that receives the incident light that has entered the projection-type display device from the outside via the projection optical system is provided in the direction in which the incident light is reflected by the mirror. Therefore, an image of the outside can be captured via the projection optical system. At this time, the projection of an image and the capture of an image are performed via the projection optical system, thereby reducing the occurrence of an error between an image projection position and an image capture position. The image capture element is provided in the direction in which the incident light is reflected by the mirror that assumes a posture different from the ON posture and the posture perpendicular to the ON direction. Therefore, an optical path separating element need not be added, for example, between the electro-optical device and the projection optical system and between the electro-optical device and the light source unit for the capture of an image. Thus, the loss of light intensity due to the optical path separating element does not occur and therefore the light intensities of both of the projection light and the image capture light can be increased.

In the projection-type display device according to the first aspect of the invention, it is preferred that the image capture element be provided in a direction in which the incident light is reflected by the mirror that assumes the OFF posture. According to this structure, during a period in which an image is projected, the image capture element can receive the incident light reflected by the mirror that assumes the OFF posture out of the plurality of mirrors. Thus, the projection of an image and the capture of an image can be performed simultaneously and therefore the projected image can be captured.

In the projection-type display device according to the first aspect of the invention, there may be employed a structure in which the projection optical system is provided in a direction perpendicular to the mirror during a period in which driving by the drive element is halted.

In the projection-type display device according to the first aspect of the invention, there may be employed a structure in which the drive element causes the mirror in a steady posture, which is a posture of the mirror during a period in which driving by the drive element is halted, to pivot to one side about an axis parallel to the mirror in the steady posture so as to assume the ON posture, or to pivot to another side about the axis so as to assume the OFF posture.

In the projection-type display device according to the first aspect of the invention, there may be employed a structure in which the drive element causes the mirror in a steady posture, which is a posture of the mirror during a period in which driving by the drive element is halted, to pivot to one side about a first axis parallel to the mirror in the steady posture so as to assume the ON posture, or to pivot to one side about a second axis parallel to the mirror in the steady posture and intersecting the first axis so as to assume the OFF posture.

A projection-type display device according to a second aspect of the invention includes a light source unit, a first electro-optical device that modulates first light emitted from the light source unit, a second electro-optical device that modulates second light emitted from the light source unit at a wavelength different from a wavelength of the first light from the light source unit, a synthesizing optical system that synthesizes first modulated light obtained through the modulation performed by the first electro-optical device and second modulated light obtained through the modulation performed by the second electro-optical device, and a projection optical system that projects image light obtained through the synthesis performed by the synthesizing optical system. The first electro-optical device includes a first mirror that modulates light, and a first drive element that causes the first mirror to switch between a first ON posture in which the first mirror reflects the first light from the light source unit in a first ON direction toward the synthesizing optical system and a first OFF posture in which the first mirror reflects the first light from the light source unit in a first OFF direction different from the first ON direction. The second electro-optical device includes a second mirror that modulates light, and a second drive element that causes the second mirror to switch between a second ON posture in which the second mirror reflects the second light from the light source unit in a second ON direction toward the synthesizing optical system and a second OFF posture in which the second mirror reflects the second light from the light source unit in a second OFF direction different from the second ON direction. A first image capture element that receives first incident light that has entered the projection-type display device from an outside via the projection optical system and the synthesizing optical system is provided in a direction in which the first incident light is reflected by the first mirror that assumes the first OFF posture.

In the second aspect of the invention, in both of the first electro-optical device and the second electro-optical device, when the light is radiated from the light source unit onto the mirror that modulates light and when the mirror assumes the ON posture, the light from the light source unit is reflected in the ON direction toward the projection optical system. When the mirror assumes the OFF posture, the light from the light source unit is reflected in the OFF direction different from the ON direction toward the projection optical system. Thus, by controlling the posture of each of the plurality of mirrors, the first light and the second light from the light source unit can be modulated and an image can be projected from the projection optical system. The first image capture element that receives the first incident light that has entered the projection-type display device from the outside via the projection optical system and the synthesizing optical system is provided in the direction in which the first incident light is reflected by the first mirror. Therefore, an image of the outside can be captured via the projection optical system. At this time, the projection of an image and the capture of an image are performed via the projection optical system, thereby reducing the occurrence of the error between the image projection position and the image capture position. The first image capture element is provided in the direction in which the first incident light is reflected by the first mirror that assumes the first OFF posture. Therefore, the optical path separating element need not be added, for example, between the first electro-optical device and the projection optical system and between the first electro-optical device and the light source unit for the capture of an image. Thus, the loss of light intensity due to the optical path separating element does not occur and therefore the light intensities of both of the projection light and the image capture light can be increased. Moreover, during a period in which an image is projected, the first image capture element can receive the first incident light reflected by the first mirror that assumes the first OFF posture out of the plurality of first mirrors. Thus, the projection of an image and the capture of an image can be performed simultaneously and therefore the projected image can be captured.

In the projection-type display device according to the second aspect of the invention, there may be employed a structure in which a second image capture element that receives second incident light that has entered the projection-type display device from the outside via the projection optical system and the synthesizing optical system is provided in a direction in which the second incident light is reflected by the second mirror that assumes the second OFF posture. According to this structure, an image of the outside can be captured by using the first incident light and the second incident light.

In the projection-type display device according to the second aspect of the invention, there may be employed a structure in which the projection-type display device further includes a third electro-optical device that modulates third light emitted from the light source unit at a wavelength different from the wavelength of the first light from the light source unit and a wavelength of the second light from the light source unit, the synthesizing optical system synthesizes the first modulated light, the second modulated light, and third modulated light obtained through the modulation performed by the third electro-optical device, the third electro-optical device includes a third mirror that modulates light, and a third drive element that causes the third mirror to switch between a third ON posture in which the third mirror reflects the third light from the light source unit in a third ON direction toward the synthesizing optical system and a third OFF posture in which the third mirror reflects the third light from the light source unit in a third OFF direction different from the third ON direction, and a third image capture element that receives third incident light that has entered the projection-type display device from the outside via the projection optical system and the synthesizing optical system is provided in a direction in which the third incident light is reflected by the third mirror that assumes the third OFF posture. According to this structure, the first light, the second light, and the third light from the light source unit can be modulated and an image can be projected from the projection optical system. Further, an image of the outside can be captured by using the first incident light, the second incident light, and the third incident light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are described with reference to the drawings. In the drawings that are referred to in the following description, respective layers and members are illustrated on different scales so that the respective layers and members are illustrated in sizes large enough to be recognizable in the drawings. The numbers of mirrors and the like illustrated in the drawings are set so that the mirrors and the like are illustrated in sizes large enough to be recognizable in the drawings, but the numbers of mirrors and the like to be provided may be set larger than the numbers of mirrors and the like illustrated in the drawings.

First Embodiment

Overall Structure of Projection-Type Display Device 1000

Figure 1:
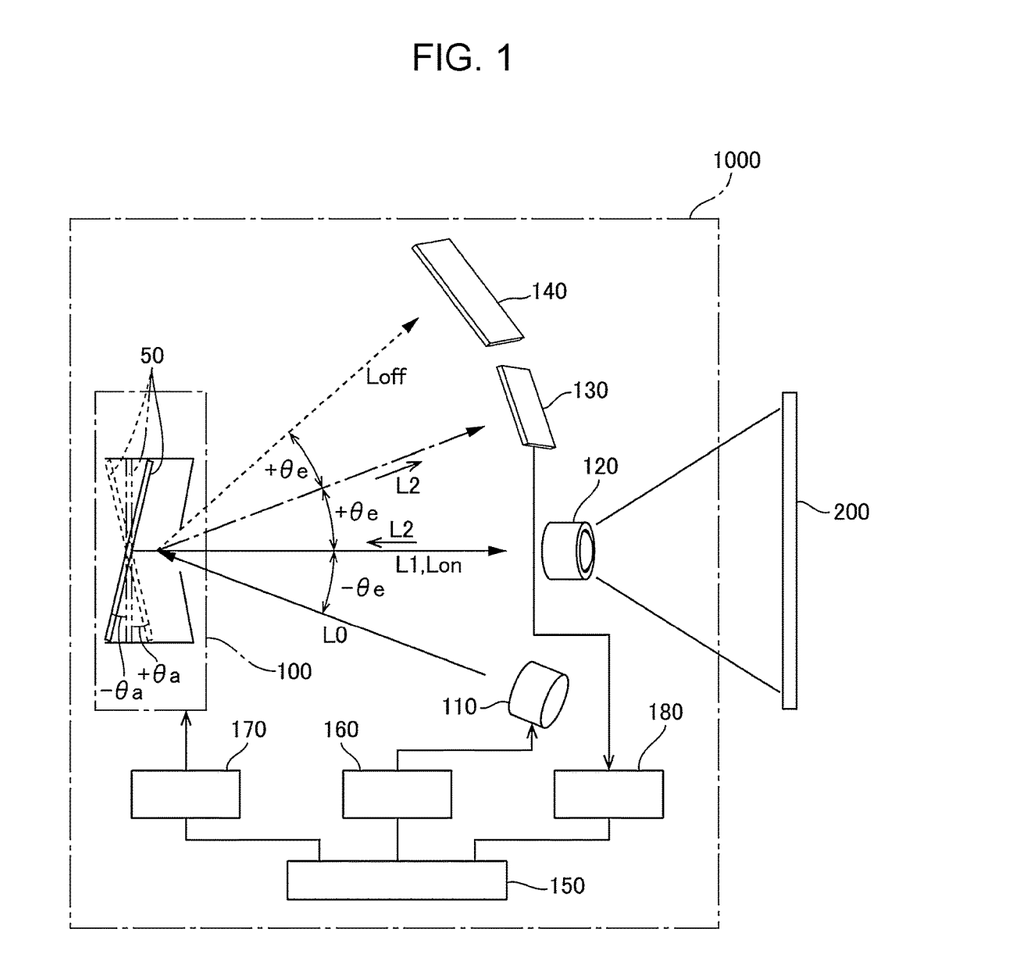
FIG. 1 is an explanatory view of a projection-type display device according to a first embodiment of the invention.

FIG. 1 is an explanatory view of a projection-type display device 1000 according to a first embodiment of the invention. FIG. 1 illustrates only one of a plurality of mirrors 50 provided in an electro-optical device 100.

The projection-type display device 1000 illustrated in FIG. 1 includes a light source unit 110, the electro-optical device 100 that modulates light emitted from the light source unit 110 based on image information, and a projection optical system 120 that projects the light modulated by the electro-optical device 100 onto a projection target 200 such as a wall surface or a screen as a projection image. The light source unit 110 is driven by a light source control section 160 to sequentially emit red light, green light, and blue light. The electro-optical device 100 is driven by an image control section 170 to sequentially perform light modulation on the red light, the green light, and the blue light and output the modulated light beams to the projection optical system 120.

For example, a structure in which white light emitted from the light source unit 110 is output to the electro-optical device 100 through a color filter may be employed for the light source unit 110. Further, a structure in which red light, green light, and blue light are sequentially emitted by sequentially turning ON a light emitting element that emits red light, a light emitting element that emits green light, and a light emitting element that emits blue light may be employed for the light source unit 110. In any case, the electro-optical device 100 modulates incident light in synchronization with a timing when the light source unit 110 emits red light, green light, and blue light.

As described later, the projection-type display device 1000 includes an image capture element 130. Detection results from the image capture element 130 are processed by an image processing section 180. In this embodiment, operation timings and the like of the light source control section 160, the image control section 170, and the image processing section 180 are controlled by a superordinate control section 150.

Basic Structure of Electro-Optical Device 100

Figure 2:
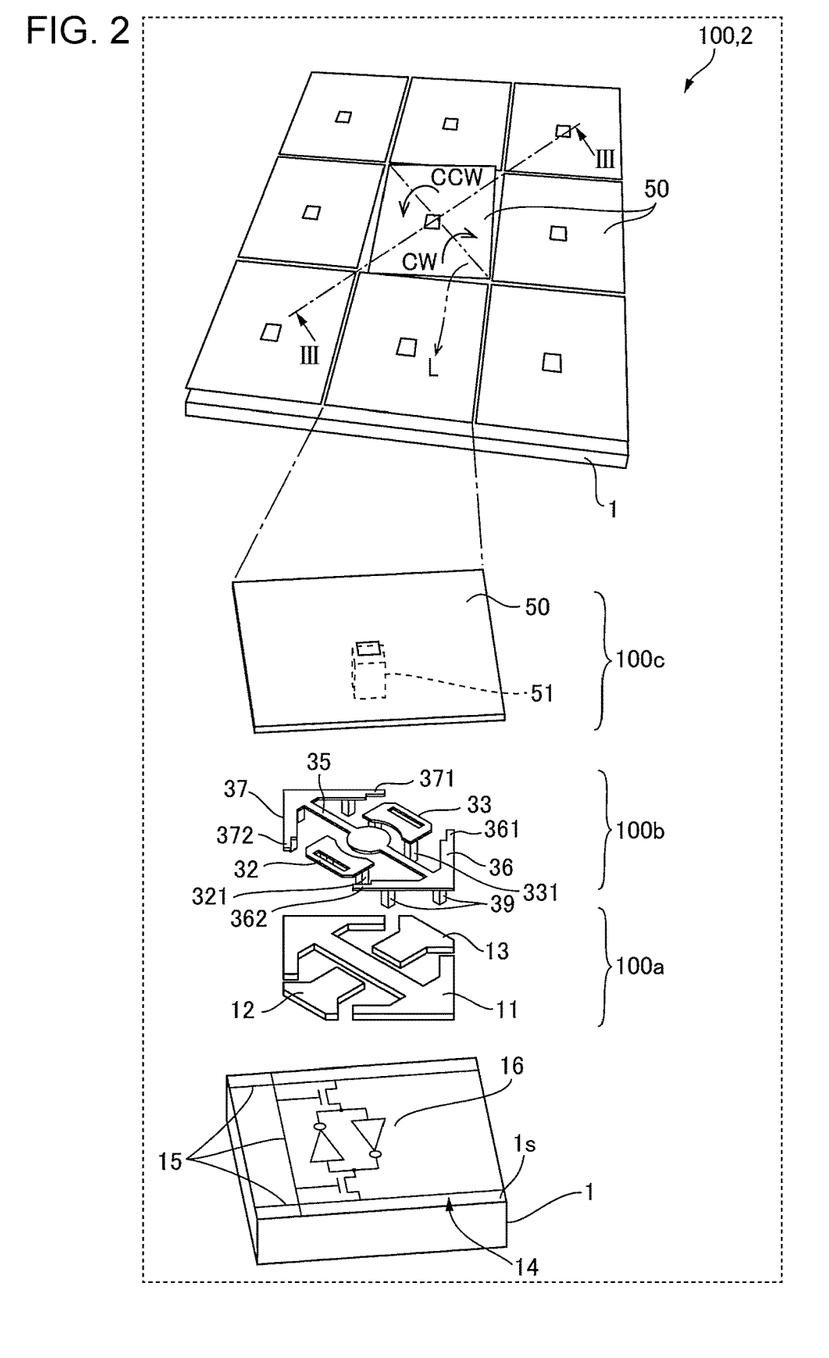
FIG. 2 is an explanatory view schematically illustrating an example of the basic structure of an electro-optical device illustrated in FIG. 1.
Figure 3:
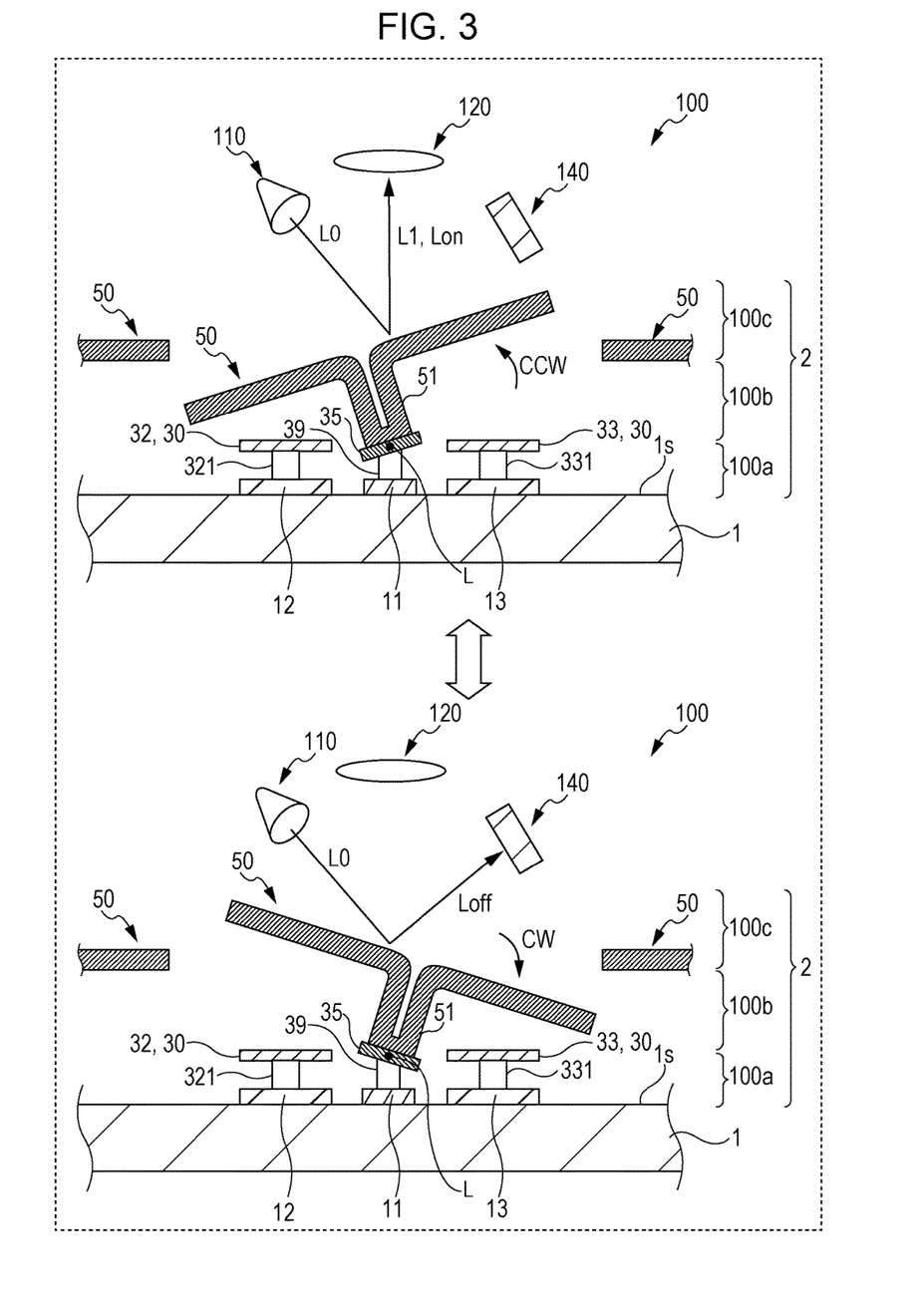
FIG. 3 is an explanatory view schematically illustrating a cross section around a mirror of the electro-optical device, which is taken along the line III-III of FIG. 2.

FIG. 2 is an explanatory view schematically illustrating an example of the basic structure of the electro-optical device 100 illustrated in FIG. 1. FIG. 2 also illustrates a state in which the electro-optical device 100 is partially exploded. FIG. 3 is an explanatory view schematically illustrating a cross section around the mirror 50 of the electro-optical device 100, which is taken along the line III-III of FIG. 2. FIG. 3 illustrates an ON posture of the mirror 50 that is tilted to one side CCW about an axis L and an OFF posture of the mirror 50 that is tilted to another side CW about the axis L.

As illustrated in FIG. 2 and FIG. 3, the electro-optical device 100 includes a chip 2 having the plurality of mirrors 50, which modulate light, arranged in matrix on one surface is of an element substrate 1. In the chip 2, the mirror 50 is spaced away from the element substrate 1. The element substrate 1 is, for example, a silicon substrate. The mirror 50 is a micro-mirror having a planar size of, for example, 10 to 30 µm on each side. The mirrors 50 are arranged in an array of, for example, 800×600 to 1920×1080, and one mirror 50 corresponds to one pixel of the projection image.

The surface of the mirror 50 is a reflective surface formed of a reflective metal film such as aluminum. The chip 2 includes a first level portion 100a including, for example, a substrate-side bias electrode 11 and substrate-side address electrodes 12 and 13 formed on the one surface is of the element substrate 1, a second level portion 100b including elevated address electrodes 32 and 33 and a hinge 35, and a third level portion 100c including the mirror 50. In the first level portion 100a, an address designating circuit 14 is formed on the element substrate 1. The address designating circuit 14 includes a memory cell for selectively controlling an operation of each mirror 50, wires 15 such as word lines and bit lines, and the like. The address designating circuit 14 has a circuit structure similar to that of a random access memory (RAM) including a CMOS circuit 16.

The second level portion 100b includes the elevated address electrodes 32 and 33, the hinge 35, and a mirror support post 51. The elevated address electrodes 32 and 33 are electrically connected to the substrate-side address electrodes 12 and 13 via electrode support posts 321 and 331 and are supported by the substrate-side address electrodes 12 and 13, respectively. Hinge arms 36 and 37 extend from both ends of the hinge 35. The hinge arms 36 and 37 are electrically connected to the substrate-side bias electrode 11 via arm support posts 39 and are supported by the substrate-side bias electrode 11. The mirror 50 is electrically connected to the hinge 35 via the mirror support post 51 and is supported by the hinge 35. Thus, the mirror 50 is electrically connected to the substrate-side bias electrode 11 via the mirror support post 51, the hinge 35, the hinge arms 36 and 37, and the arm support posts 39 and a bias voltage is applied from the substrate-side bias electrode 11. Stoppers 361, 362, 371, and 372 that prevent contact between the mirror 50 and the elevated address electrodes 32 and 33 by being brought into abutment against the mirror 50 when the mirror 50 is tilted are formed at the distal ends of the hinge arms 36 and 37, respectively.

The elevated address electrodes 32 and 33 constitute a drive element 30 that drives the mirror 50 to be tilted by generating an electrostatic force between the drive element 30 and the mirror 50 on both sides across the hinge 35. The substrate-side address electrodes 12 and 13 may also be constructed so as to drive the mirror 50 to be tilted by generating electrostatic forces between the substrate-side address electrodes 12 and 13 and the mirror 50. In this case, the drive element 30 is constituted by the elevated address electrodes 32 and 33 and the substrate-side address electrodes 12 and 13. The hinge 35 turns when the mirror 50 is tilted so as to be attracted to the elevated address electrode 32 or the elevated address electrode 33 as illustrated in FIG. 3 by application of drive voltages to the elevated address electrodes 32 and 33. When the attraction force for the mirror 50 is eliminated by stopping the application of the drive voltages to the elevated address electrodes 32 and 33, the hinge 35 exerts a force for returning the mirror 50 to a steady posture in which the mirror 50 is parallel to the element substrate 1.

In this embodiment, during a period in which the driving of the mirror 50 by the drive element 30 is halted, the mirror 50 assumes the steady posture in which the mirror 50 is parallel to the element substrate 1. In this state, when the mirror 50 pivots to the one side CCW about the axis L extending along the hinge 35 parallel to the mirror 50 in the steady posture so as to assume the ON posture in which the mirror 50 is tilted to the elevated address electrode 32 on one side, the mirror 50 reflects light L0 emitted from the light source unit 110 in an ON direction Lon toward the projection optical system 120.

When the mirror 50 pivots to the other side CW about the axis L so as to assume the OFF posture in which the mirror 50 is tilted to the elevated address electrode 33 on the other side, the mirror 50 reflects the light L0 emitted from the light source unit 110 in an OFF direction Loff different from the ON direction Lon. Thus, the mirror 50 in the OFF posture does not reflect the light L0 from the light source unit 110 toward the projection optical system 120. In this embodiment, a light absorbing device 140 is provided in the OFF direction Loff.

This driving is performed in each of the plurality of mirrors 50 illustrated in FIG. 2. As a result, the light L0 emitted from the light source unit 110 is modulated to image light L1 by the plurality of mirrors 50 and is projected from the projection optical system 120 to display an image.

Structures of Image Capture Element 130 and Other Components

By utilizing the driving of the mirror 50 that is performed by the drive element 30, the projection-type display device 1000 of this embodiment performs projection of an image via the projection optical system 120 and capture of an image of incident light that has entered the projection-type display device 1000 via the projection optical system 120. Therefore, in the projection-type display device 1000, as illustrated in FIG. 1, the projection optical system 120 is arranged in a direction perpendicular to the mirror 50 in the steady posture (posture indicated by the two-dot chain line in FIG. 1). The direction to the projection optical system 120 is the ON direction Lon.

The light source unit 110 radiates the light L0 onto the mirror 50 in a direction at an angle of $-\theta e°$ with respect to the ON direction Lon. Thus, when the drive element 30 causes the mirror 50 to switch from the steady posture to the ON posture (posture indicated by the solid line in FIG. 1) in which the mirror 50 is tilted at $-\theta a°$, the mirror 50 reflects the light L0 from the light source unit 110 in the ON direction Lon toward the projection optical system 120. The angles $\theta a$ and $\theta e$ satisfy the following relationship.

$$\theta e = 2 \times \theta a$$

For example, $\theta a°$ is 12°. In this case, $\theta e°$ is 24°.

The light absorbing device 140 is arranged in a direction at an angle of $+(2\times\theta e)°$ (OFF direction Loff) with respect to the ON direction Lon. Thus, when the drive element 30 causes the mirror 50 to switch from the steady posture to the OFF posture (posture indicated by the dotted line in FIG. 1) in which the mirror 50 is tilted at $+\theta a°$, the mirror 50 reflects the light L0 from the light source unit 110 in the OFF direction Loff toward the light absorbing device 140.

In this embodiment, the image capture element 130 that receives incident light L2 that has entered the projection-type display device 1000 from the outside via the projection optical system 120 is provided in a direction in which the incident light L2 is reflected by the mirror 50 that assumes a posture different from the ON posture and a posture perpendicular to the ON direction Lon. In this embodiment, the image capture element 130 is arranged in a direction at an angle of $+\theta e°$ with respect to the ON direction Lon. That is, the image capture element 130 is arranged in a direction in which an angle formed between the ON direction Lon and the OFF direction Loff about the mirror 50 is halved. Therefore, the image capture element 130 is arranged in a direction in which the incident light L2 that has entered the projection-type display device 1000 from the outside via the projection optical system 120 is reflected by the mirror 50 that assumes the OFF posture.

In this embodiment, the number of pixels of each of the electro-optical device 100 and the image capture element 130 is, for example, 1920×1080 dots. The number of pixels of the image capture element 130 may be smaller than the number of pixels of the electro-optical device 100.

Main Advantages of this Embodiment

As described above, in the projection-type display device 1000 of this embodiment, when the light L0 is radiated from the light source unit 110 onto the mirror 50 that modulates light and when the mirror 50 assumes the ON posture, the light L0 from the light source unit 110 is reflected in the ON direction Lon toward the projection optical system 120. When the mirror 50 assumes the OFF posture, the light L0 from the light source unit 110 is reflected in the OFF direction Loff different from the ON direction Lon toward the projection optical system 120 but is not reflected in the ON direction Lon toward the projection optical system 120. Thus, by controlling the posture of each of the plurality of mirrors 50 illustrated in FIG. 2, the light L0 from the light source unit 110 can be modulated and an image can be projected from the projection optical system 120.

The image capture element 130 that receives the incident light L2 that has entered the projection-type display device 1000 from the outside via the projection optical system 120 is provided in the direction in which the incident light L2 is reflected by the mirror 50. Therefore, an image of the outside can be captured via the projection optical system 120. At this time, the projection of an image and the capture of an image are performed via the projection optical system 120, thereby reducing the occurrence of an error between an image projection position and an image capture position. The image capture element 130 is provided in the direction in which the incident light L2 is reflected by the mirror 50 that assumes a posture different from the ON posture and the posture perpendicular to the ON direction Lon. Therefore, an optical path separating element need not be added between the electro-optical device 100 and the projection optical system 120 or between the electro-optical device 100 and the light source unit 110 for the capture of an image. Thus, the loss of light intensity due to the optical path separating element does not occur and therefore the light intensities of both of the projection light and the image capture light can be increased.

The image capture element 130 is provided in the direction in which the incident light L2 is reflected by the mirror 50 that assumes the OFF posture. Therefore, during a period in which an image is projected, the image capture element 130 can receive the incident light reflected by the mirror 50 that assumes the OFF posture out of the plurality of mirrors 50. Thus, the projection of an image and the capture of an image can be performed simultaneously and therefore the projected image can be captured.

For example, when the projection-type display device 1000 projects a predetermined test pattern onto the projection target 200 in a preparation stage for the projection of an image, an image of the test pattern projected onto the projection target 200 can be captured by the image capture element 130. Thus, the projection position on the projection target 200 can be adjusted based on the image capture result from the image capture element 130. When the projection target 200 has irregularities, the image projected onto the projection target 200 is susceptible to distortion. Even in this case, the projection image can be corrected based on the image capture result from the image capture element 130.

Second Embodiment

Figure 4:
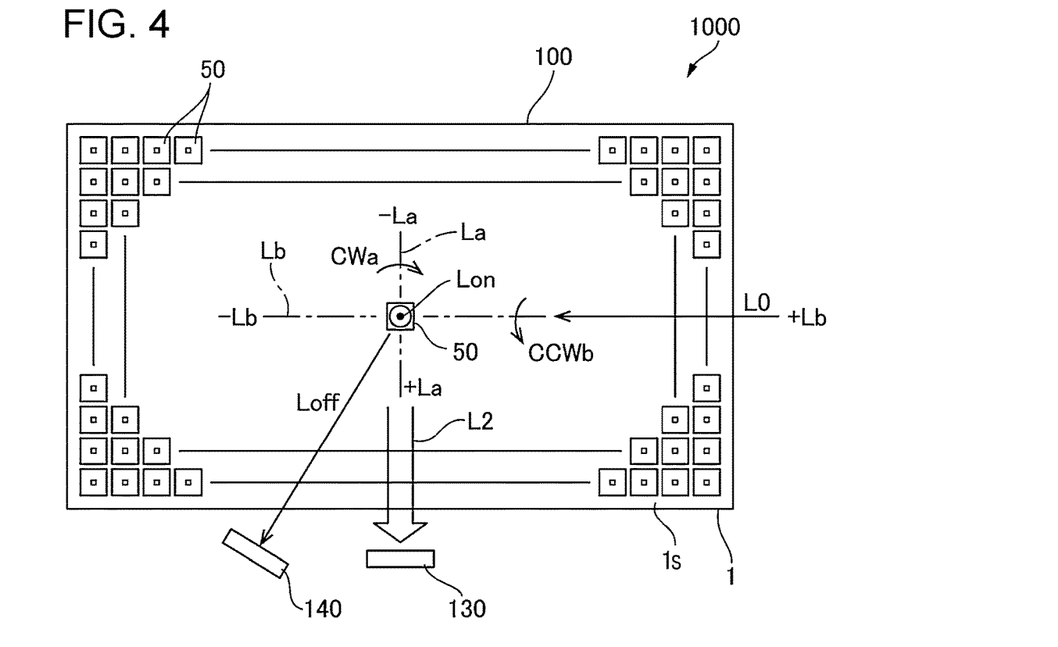
FIG. 4 is an explanatory view of a projection-type display device according to a second embodiment of the invention.
Figure 5:
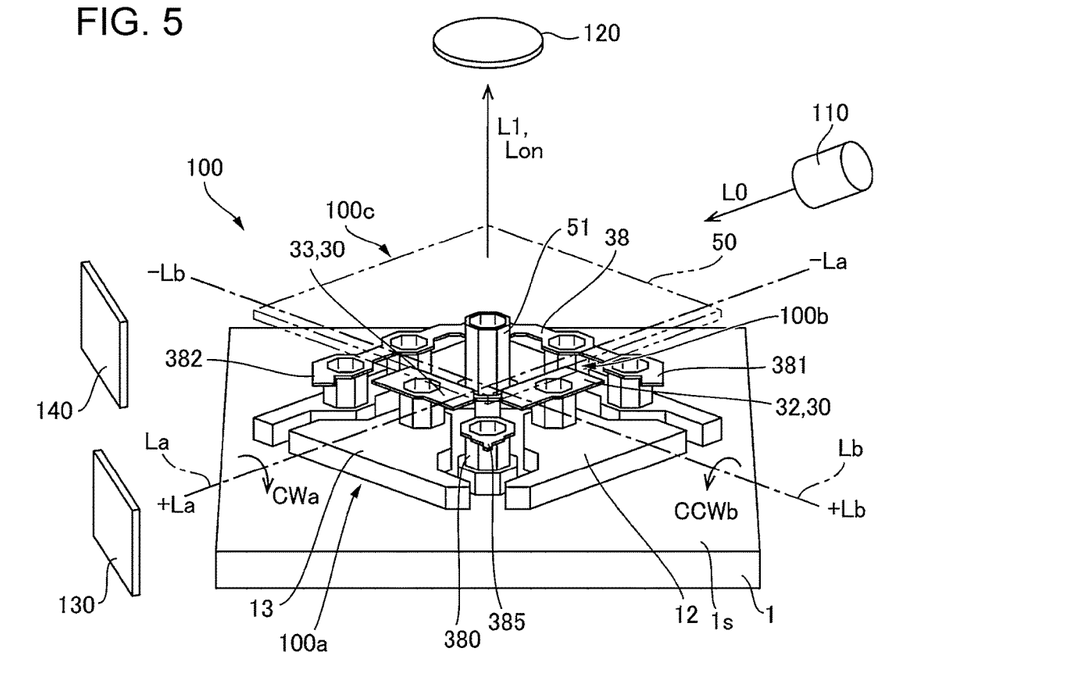
FIG. 5 is an explanatory view of an electro-optical device used in the projection-type display device illustrated in FIG. 4.
Figure 6:
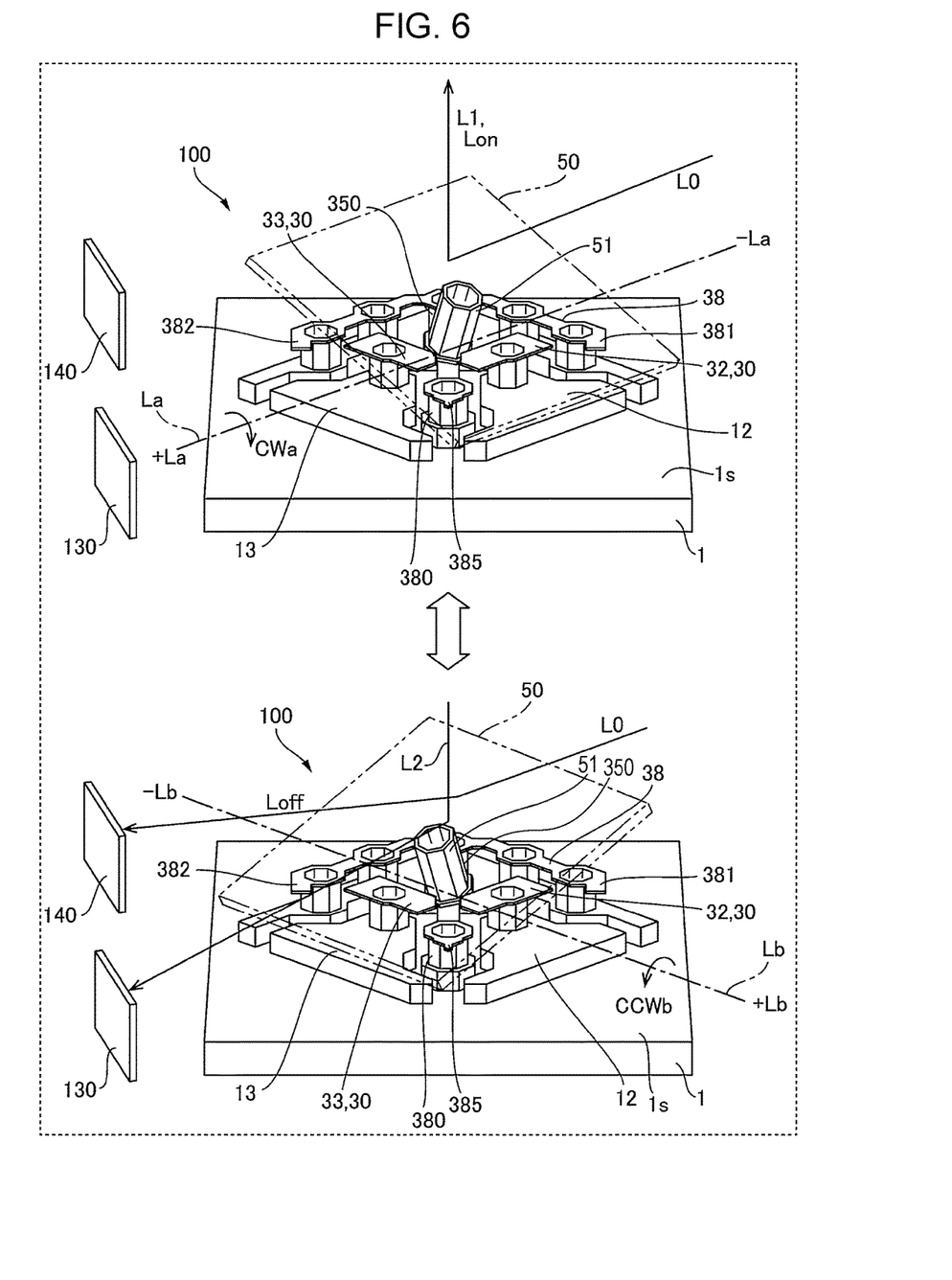
FIG. 6 is an explanatory view of a case in which a mirror is driven in the electro-optical device illustrated in FIG. 5.

FIG. 4 is an explanatory view of a projection-type display device 1000 according to a second embodiment of the invention. FIG. 5 is an explanatory view of an electro-optical device 100 used in the projection-type display device 1000 illustrated in FIG. 4. FIG. 5 illustrates a steady posture of the mirror 50. FIG. 6 is an explanatory view of a case in which a mirror 50 is driven in the electro-optical device 100 illustrated in FIG. 5. FIG. 6 illustrates an ON posture of the mirror 50 that is tilted to one side CWa about a first axis La and an OFF posture of the mirror 50 that is tilted to one side CCWb about a second axis Lb. FIG. 5 and FIG. 6 illustrate the mirror 50 by a two-dot chain line. The basic structure of this embodiment is similar to that of the first embodiment and therefore common parts are denoted by the same reference symbols to omit description thereof.

In the electro-optical device 100 used in the projection-type display device 1000 illustrated in FIG. 4, the plurality of mirrors 50 are arranged in matrix on the one surface is of the element substrate 1 similarly to the first embodiment. In this embodiment, as described below, the mirror 50 pivots to the one side CWa about the first axis La which is one of the first axis La and the second axis Lb intersecting each other so as to assume the ON posture, and also pivots to the one side CCWb about the second axis Lb so as to assume the OFF posture.

More specifically, as illustrated in FIG. 5, similarly to the electro-optical device 100 described with reference to FIG. 2 and FIG. 3, the electro-optical device 100 includes the first level portion 100a including, for example, the substrate-side address electrodes 12 and 13 formed on the one surface is of the element substrate 1, the second level portion 100b including the elevated address electrodes 32 and 33 (drive element 30) and a cantilever hinge 350 (see FIG. 6), and the third level portion 100c including the mirror 50. In this embodiment, the second level portion 100b includes the mirror support post 51 connecting the distal end of the cantilever hinge 350 to the mirror 50 and a hinge spring 38 electrically connected to the hinge 350. The hinge spring 38 has stoppers 381 and 382 to be brought into abutment against the mirror 50 when the mirror 50 is tilted. Further, the second level portion 100b includes an electrode 380 electrically connected to the hinge spring 38 and a stopper 385 provided on the electrode 380.

The elevated address electrodes 32 and 33 are arranged so as to form a right angle therebetween on both sides across the distal end of the hinge 350. Thus, when electrostatic forces are generated between the elevated address electrode 32 and the mirror 50 and between the elevated address electrode 33 and the mirror 50, the hinge 350 can turn to achieve the ON posture in which the mirror 50 is tilted to the one side CWa about the first axis La and the OFF posture in which the mirror 50 is tilted to the one side CCWb about the second axis Lb. When the attraction force for the mirror 50 is eliminated by stopping the application of drive voltages to the elevated address electrodes 32 and 33, the hinge 350 exerts a force for returning the mirror 50 to a posture in which the mirror 50 is parallel to the element substrate 1 (steady posture). The first axis La is an axis parallel to the mirror 50 in the steady posture and the second axis Lb is an axis parallel to the mirror 50 in the steady posture and extending in a direction intersecting the first axis La.

In this embodiment, similarly to the first embodiment, by utilizing the driving of the mirror 50 that is performed by the drive element 30, the projection-type display device 1000 performs projection of an image via the projection optical system 120 and capture of an image of incident light that has entered the projection-type display device 1000 via the projection optical system 120. Therefore, in the projection-type display device 1000, as illustrated in FIG. 4 and FIG. 5, the projection optical system 120 is arranged in a direction perpendicular to the mirror 50 in the steady posture. The direction to the projection optical system 120 is the ON direction Lon.

The light source unit 110 radiates the light L0 onto the mirror 50 in a direction oblique to the ON direction Lon on one side +Lb of the direction in which the second axis Lb extends. Thus, when the drive element 30 causes the mirror 50 to switch from the steady posture to the ON posture in which the mirror 50 is tilted to the one side CWa about the first axis La as illustrated in FIG. 6, the mirror 50 reflects the light L0 from the light source unit 110 in the ON direction Lon toward the projection optical system 120. The light absorbing device 140 is arranged on one side +La of the direction in which the first axis La extends and on another side −Lb of the direction in which the second axis Lb extends. Thus, when the drive element 30 causes the mirror 50 to switch from the steady posture to the OFF posture in which the mirror 50 is tilted to the one side CCWb about the second axis Lb as illustrated in FIG. 6, the mirror 50 reflects the light L0 from the light source unit 110 in the OFF direction Loff toward the light absorbing device 140.

In this embodiment, the image capture element 130 that receives the incident light L2 that has entered the projection-type display device 1000 from the outside via the projection optical system 120 is provided in a direction in which the incident light L2 is reflected by the mirror 50 that assumes a posture different from the ON posture and a posture perpendicular to the ON direction Lon. In this embodiment, the image capture element 130 is arranged on the one side +La of the direction in which the first axis La extends. Therefore, the image capture element 130 is arranged in a direction in which the incident light L2 that has entered the projection-type display device 1000 from the outside via the projection optical system 120 is reflected by the mirror 50 that assumes the OFF posture.

As described above, in the projection-type display device 1000 of this embodiment, similarly to the first embodiment, by controlling the posture of each of the plurality of mirrors 50, the light L0 from the light source unit 110 can be modulated and an image can be projected from the projection optical system 120. The image capture element 130 is provided in the direction in which the incident light L2 that has entered the projection-type display device 1000 from the outside via the projection optical system 120 is reflected by the mirror 50 that assumes the OFF posture. Thus, advantages similar to those of the first embodiment are attained, for example, in that an image of the outside can be captured via the projection optical system 120.

In this embodiment, the drive element 30 causes the mirror 50 to pivot to the one side CWa about the first axis La so as to assume the ON posture, and also pivot to the one side CCWb about the second axis Lb so as to assume the OFF posture. Therefore, the ON direction Lon and the OFF direction Loff can be set greatly different from each other. Thus, the degrees of freedom in terms of layout are high when the projection optical system 120, the light absorbing device 140, and the image capture element 130 are provided.

Third Embodiment

Figure 7:
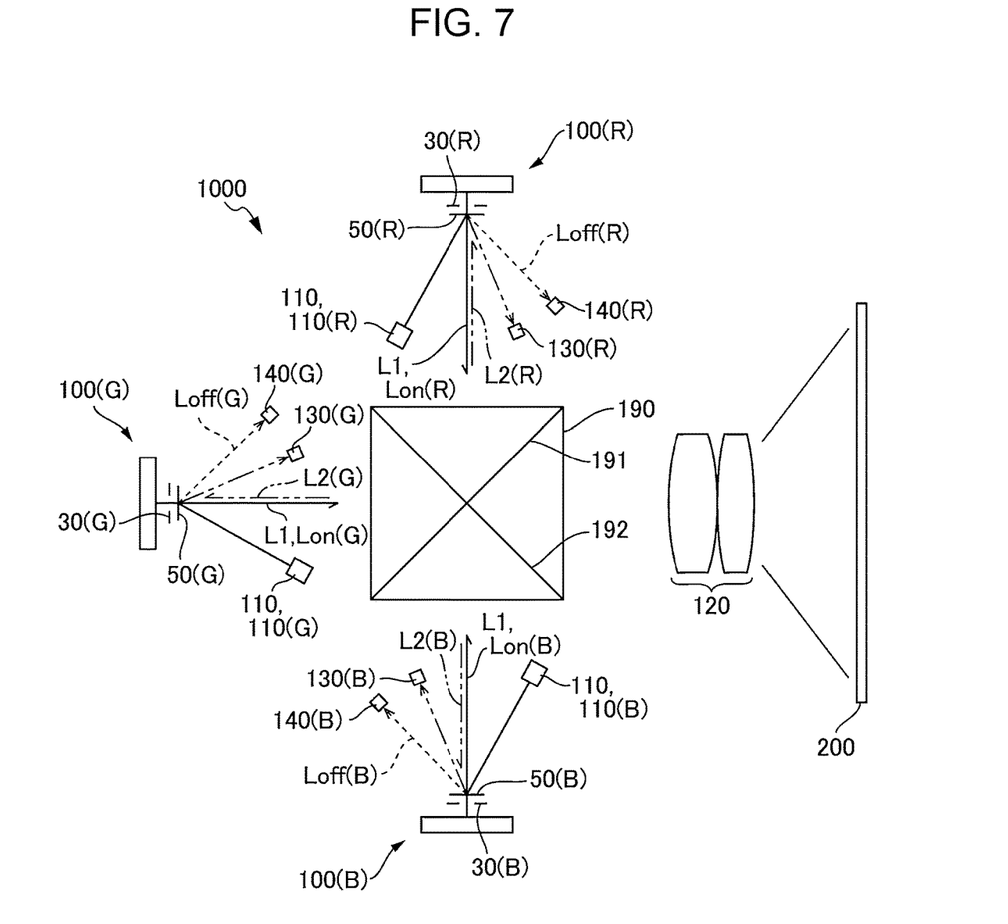
FIG. 7 is an explanatory view of a projection-type display device according to a third embodiment of the invention.

FIG. 7 is an explanatory view schematically illustrating the structure of a projection-type display device 1000 according to a third embodiment of the invention. In the first and second embodiments, red light, green light, and blue light sequentially emitted from the light source unit 110 are sequentially subjected to light modulation by the electro-optical device 100. In this embodiment, as illustrated in FIG. 7, a plurality of light beams having different wavelengths are simultaneously emitted from the light source unit 110 and are radiated onto corresponding electro-optical devices. In the following description, first light L0(R), second light L0(G), and third light L0(B) that are emitted from the light source unit 110 and have different wavelengths are red light, green light, and blue light, respectively.

As illustrated in FIG. 7, in the projection-type display device 1000 of this embodiment, the light source unit 110 includes a first light source unit 110(R), a second light source unit 110(G), and a third light source unit 110(B) that emit light beams of respective colors. Further, the projection-type display device 1000 includes a first electro-optical device 100(R) that modulates the red light (first light L0(R)) emitted from the first light source unit 110(R), a second electro-optical device 100(G) that modulates the green light (second light L0(G)) emitted from the second light source unit 110(G), and a third electro-optical device 100(B) that modulates the blue light (third light L0(B)) emitted from the third light source unit 110(B). Therefore, the projection-type display device 1000 includes a synthesizing optical system 190. Thus, first modulated light of the first light L0(R) that is output from the first electro-optical device 100(R), second modulated light of the second light L0(G) that is output from the second electro-optical device 100(G), and third modulated light of the third light L0(B) that is output from the third electro-optical device 100(B) are synthesized by the synthesizing optical system 190 and then projected in an enlarged manner from the projection optical system 120. In this embodiment, the synthesizing optical system 190 is constructed of a dichroic prism including dichroic mirrors 191 and 192. The dichroic mirror 191 reflects blue light while allowing red light and green light to pass therethrough. The dichroic mirror 192 reflects red light while allowing blue light and green light to pass therethrough.

Each of the first electro-optical device 100(R), the second electro-optical device 100(G), and the third electro-optical device 100(B) has the same structure as that of the electro-optical device 100 described with reference to FIG. 2, FIG. 3, FIG. 4, and FIG. 5. Thus, the first electro-optical device 100(R) includes a first mirror 50(R) that modulates light and a first drive element 30(R) that is the drive element 30 described with reference to FIG. 3 and the like. The first drive element 30(R) causes the first mirror 50(R) to switch between a first ON posture in which the first mirror 50(R) reflects the first light L0(R) from the first light source unit 110(R) in a first ON direction Lon(R) toward the synthesizing optical system 190 and a first OFF posture in which the first mirror 50(R) reflects the first light L0(R) from the first light source unit 110(R) in a first OFF direction Loff(R) different from the first ON direction Lon(R). A first light absorbing device 140(R) is arranged in the first OFF direction Loff(R).

The second electro-optical device 100(G) includes a second mirror 50(G) that modulates light and a second drive element 30(G) that is the drive element 30 described with reference to FIG. 3 and the like. The second drive element 30(G) causes the second mirror 50(G) to switch between a second ON posture in which the second mirror 50(G) reflects the second light L0(G) from the second light source unit 110(G) in a second ON direction Lon(G) toward the synthesizing optical system 190 and a second OFF posture in which the second mirror 50(G) reflects the second light L0(G) from the second light source unit 110(G) in a second OFF direction Loff(G) different from the second ON direction Lon(G). A second light absorbing device 140(G) is arranged in the second OFF direction Loff(G).

The third electro-optical device 100(B) includes a third mirror 50(B) that modulates light and a third drive element 30(B) that is the drive element 30 described with reference to FIG. 3 and the like. The third drive element 30(B) causes the third mirror 50(B) to switch between a third ON posture in which the third mirror 50(B) reflects the third light L0(B) from the third light source unit 110(B) in a third ON direction Lon(B) toward the synthesizing optical system 190 and a third OFF posture in which the third mirror 50(B) reflects the third light L0(B) from the third light source unit 110(B) in a third OFF direction Loff(B) different from the third ON direction Lon(B). A third light absorbing device 140(B) is arranged in the third OFF direction Loff(B).

In the projection-type display device 1000 of this embodiment, a first image capture element 130(R) is provided for the first electro-optical device 100(R). The first image capture element 130(R) is arranged in a direction in which first incident light L2(R) that has entered the projection-type display device 1000 from the outside toward the first electro-optical device 100(R) via the projection optical system 120 and the synthesizing optical system 190 is reflected by the first mirror 50(R) that assumes a posture different from the first ON posture and a posture perpendicular to the first ON direction Lon(R). In this embodiment, the first image capture element 130(R) is arranged in a direction in which the first incident light L2(R) is reflected by the first mirror 50(R) that assumes the first OFF posture. Thus, the first image capture element 130(R) can receive the first incident light L2(R) reflected by the first mirror 50(R) that assumes the first OFF posture.

A second image capture element 130(G) is provided for the second electro-optical device 100(G). The second image capture element 130(G) is arranged in a direction in which second incident light L2(G) that has entered the projection-type display device 1000 from the outside toward the second electro-optical device 100(G) via the projection optical system 120 and the synthesizing optical system 190 is reflected by the second mirror 50(G) that assumes a posture different from the second ON posture and a posture perpendicular to the second ON direction Lon(G). In this embodiment, the second image capture element 130(G) is arranged in a direction in which the second incident light L2(G) is reflected by the second mirror 50(G) that assumes the second OFF posture. Thus, the second image capture element 130(G) can receive the second incident light L2(G) reflected by the second mirror 50(G) that assumes the second OFF posture.

A third image capture element 130(B) is provided for the third electro-optical device 100(B). The third image capture element 130(B) is arranged in a direction in which third incident light L2(B) that has entered the projection-type display device 1000 from the outside toward the third electro-optical device 100(B) via the projection optical system 120 and the synthesizing optical system 190 is reflected by the third mirror 50(B) that assumes a posture different from the third ON posture and a posture perpen-dicular to the third ON direction Lon(B). In this embodiment, the third image capture element 130(B) is arranged in a direction in which the third incident light L2(B) is reflected by the third mirror 50(B) that assumes the third OFF posture. Thus, the third image capture element 130(B) can receive the third incident light L2(B) reflected by the third mirror 50(B) that assumes the third OFF posture.

In the projection-type display device 1000 constructed as described above, by controlling the posture of each of the plurality of first mirrors 50(R) of the first electro-optical device 100(R), the plurality of second mirrors 50(G) of the second electro-optical device 100(G), and the plurality of third mirrors 50(B) of the third electro-optical device 100 (B), the first light L0(R) from the first light source unit 110(R), the second light L0(G) from the second light source unit 110(G), and the third light L0(B) from the third light source unit 110(B) can be modulated and an image can be projected from the projection optical system 120.

The first image capture element 130(R), the second image capture element 130(G), and the third image capture element 130(B) are provided in the directions in which the first incident light L2(R), the second incident light L2(G), and the third incident light L2(B) that have entered the projection-type display device 1000 from the outside via the projection optical system 120 and the synthesizing optical system 190 are reflected by the first mirror 50(R), the second mirror 50(G), and the third mirror 50(B), respectively. Therefore, an image of the outside can be captured via the projection optical system 120 and the synthesizing optical system 190. Thus, when a predetermined test pattern that uses red light is projected onto the projection target 200 in a preparation stage for the projection of a color image, an image of the test pattern projected onto the projection target 200 can be captured by the first image capture element 130(R). Accordingly, the projection position on the projection target 200 can be adjusted based on the image capture result from the first image capture element 130(R). When the projection target 200 has irregularities, the image projected onto the projection target 200 is susceptible to distortion. Even in this case, the projection image can be corrected based on the image capture result from the first image capture element 130(R). During the adjustment work, the predetermined test pattern that uses red light is projected onto the projection target 200 and therefore an unadjusted color image is not projected. Accordingly, it is possible to avoid the occurrence of a case in which the unadjusted color image is viewed by a third person.

Modified Examples of Third Embodiment

In the third embodiment, the first light, the second light, and the third light from the light source unit are red light, green light, and blue light, respectively. The first light, the second light, and the third light from the light source unit need not correspond to red light, green light, and blue light, respectively, as long as the first light, the second light, and the third light from the light source unit have different wavelengths. For example, the first light from the light source unit may correspond to green light, the second light from the light source unit may correspond to red light, and the third light from the light source unit may correspond to blue light.

In the third embodiment, the first image capture element, the second image capture element, and the third image capture element are provided for the first incident light, the second incident light, and the third incident light, respectively. For example, the image capture element (first image capture element) may be provided only for the first incident light. Also in this case, the first incident light can be captured by the first image capture element while the first light from the light source unit is modulated and a predetermined test pattern is projected onto the projection target 200.

When a predetermined test pattern is projected onto the projection target 200, the test pattern may be projected by using light of any color. It is preferred that green light be used from the viewpoint of reducing the visibility to a third person.

Other Embodiments

In the embodiments described above, the image capture element 130 is arranged in the direction in which the incident light L2 is reflected by the mirror 50 that assumes the OFF posture. The image capture element 130 may be arranged in a direction other than the direction in which the incident light L2 is reflected by the mirror 50 that assumes the OFF posture as long as the incident light L2 is reflected by the mirror 50 that assumes a posture different from the ON posture and a posture perpendicular to the ON direction Lon. Also in this case, an image of the outside can be captured via the projection optical system by driving the mirror 50 so as to assume a predetermined posture by the drive element 30 before an image is projected.

The entire disclosures of Japan Patent Application No.: 2016-128516, filed Jun. 29, 2016 is expressly incorporated by reference herein.

What is claimed is:

1. A projection-type display device, comprising:
   a light source unit;
   an electro-optical device that modulates light emitted from the light source unit; and
   a projection optical system that projects the light modulated by the electro-optical device,
   wherein the electro-optical device includes:
      a mirror that modulates light; and
      a drive element that causes the mirror to switch between an ON posture in which the mirror reflects the light from the light source unit in an ON direction toward the projection optical system and an OFF posture in which the mirror reflects the light from the light source unit in an OFF direction different from the ON direction, and
   wherein:
      an image capture element that receives incident light that has entered the projection-type display device from an outside via the projection optical system is provided in a direction in which the incident light is reflected by the mirror that assumes a posture different from the ON posture and a posture perpendicular to the ON direction,
      the image capture element is provided in a direction in which the incident light is reflected by the mirror that assumes the OFF posture, and
      the drive element causes the mirror in a steady posture, which is a posture of the mirror during a period in which driving by the drive element is halted, to pivot to one side about a first axis parallel to the mirror in the steady posture so as to assume the ON posture, or to pivot to one side about a second axis parallel to the mirror in the steady posture and intersecting the first axis so as to assume the OFF posture.

2. The projection-type display device according to claim 1, wherein the projection optical system is provided in a direction perpendicular to the mirror during a period in which driving by the drive element is halted.

3. The projection-type display device according to claim 1, wherein the drive element causes the mirror in a steady posture, which is a posture of the mirror during a period in which driving by the drive element is halted, to pivot to one side about an axis parallel to the mirror in the steady posture so as to assume the ON posture, or to pivot to another side about the axis so as to assume the OFF posture.

4. A projection-type display device, comprising:
a light source unit;
a first electro-optical device that modulates first light emitted from the light source unit;
a second electro-optical device that modulates second light emitted from the light source unit at a wavelength different from a wavelength of the first light from the light source unit;
a synthesizing optical system that synthesizes first modulated light obtained through the modulation performed by the first electro-optical device and second modulated light obtained through the modulation performed by the second electro-optical device; and
a projection optical system that projects image light obtained through the synthesis performed by the synthesizing optical system,
wherein the first electro-optical device includes:
a first mirror that modulates light; and
a first drive element that causes the first mirror to switch between a first ON posture in which the first mirror reflects the first light from the light source unit in a first ON direction toward the synthesizing optical system and a first OFF posture in which the first mirror reflects the first light from the light source unit in a first OFF direction different from the first ON direction,
wherein the second electro-optical device includes:
a second mirror that modulates light; and
a second drive element that causes the second mirror to switch between a second ON posture in which the second mirror reflects the second light from the light source unit in a second ON direction toward the synthesizing optical system and a second OFF posture in which the second mirror reflects the second light from the light source unit in a second OFF direction different from the second ON direction, and
wherein a first image capture element that receives first incident light that has entered the projection-type display device from an outside via the projection optical system and the synthesizing optical system is provided in a direction in which the first incident light is reflected by the first mirror that assumes the first OFF posture.

5. The projection-type display device according to claim 4, wherein a second image capture element that receives second incident light that has entered the projection-type display device from the outside via the projection optical system and the synthesizing optical system is provided in a direction in which the second incident light is reflected by the second mirror that assumes the second OFF posture.

6. The projection-type display device according to claim 4, further comprising a third electro-optical device that modulates third light emitted from the light source unit at a wavelength different from the wavelength of the first light from the light source unit and a wavelength of the second light from the light source unit,
wherein the synthesizing optical system synthesizes the first modulated light, the second modulated light, and third modulated light obtained through the modulation performed by the third electro-optical device,
wherein the third electro-optical device includes:
a third mirror that modulates light; and
a third drive element that causes the third mirror to switch between a third ON posture in which the third mirror reflects the third light from the light source unit in a third ON direction toward the synthesizing optical system and a third OFF posture in which the third mirror reflects the third light from the light source unit in a third OFF direction different from the third ON direction, and
wherein a third image capture element that receives third incident light that has entered the projection-type display device from the outside via the projection optical system and the synthesizing optical system is provided in a direction in which the third incident light is reflected by the third mirror that assumes the third OFF posture.

* * * * *